United States Patent
Lindoff et al.

(10) Patent No.: US 8,824,383 B2
(45) Date of Patent: Sep. 2, 2014

(54) DOWNLINK SCHEDULING IN HETEROGENEOUS NETWORKS

(75) Inventors: Bengt Lindoff, Bjärred (SE); Lars Lindbom, Karlstad (SE); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/902,205

(22) Filed: Oct. 12, 2010

(65) Prior Publication Data

US 2011/0312319 A1    Dec. 22, 2011

Related U.S. Application Data

(60) Provisional application No. 61/357,264, filed on Jun. 22, 2010.

(51) Int. Cl.
*H04W 4/00* (2009.01)
*H04W 72/04* (2009.01)
*H04W 16/32* (2009.01)
*H04W 72/08* (2009.01)

(52) U.S. Cl.
CPC .......... *H04W 72/042* (2013.01); *H04W 72/048* (2013.01); *H04W 16/32* (2013.01); *H04W 72/085* (2013.01)
USPC .......................................... 370/329; 455/450

(58) Field of Classification Search
USPC ......... 455/424, 425, 443, 444, 436, 447, 450; 370/329, 317, 237
See application file for complete search history.

(56) References Cited

U.S. PATENT DOCUMENTS

| 5,682,249 | A | 10/1997 | Harrington et al. | |
|---|---|---|---|---|
| 5,956,431 | A | 9/1999 | Iourcha et al. | |
| 6,600,772 | B1 | 7/2003 | Zeira et al. | |
| 2003/0138152 | A1 | 7/2003 | Fenney | |
| 2003/0210668 | A1* | 11/2003 | Malladi et al. | 370/335 |
| 2004/0142692 | A1* | 7/2004 | Schwarz et al. | 455/442 |
| 2006/0105796 | A1* | 5/2006 | Malladi et al. | 455/522 |
| 2008/0285499 | A1* | 11/2008 | Zhang et al. | 370/315 |
| 2009/0003272 | A1* | 1/2009 | Payne et al. | 370/329 |
| 2009/0196245 | A1* | 8/2009 | Ji | 370/329 |
| 2009/0252075 | A1* | 10/2009 | Ji et al. | 370/312 |
| 2010/0008230 | A1* | 1/2010 | Khandekar et al. | 370/237 |
| 2010/0008244 | A1* | 1/2010 | Sampath et al. | 370/252 |
| 2010/0008282 | A1 | 1/2010 | Bhattad et al. | |

(Continued)

FOREIGN PATENT DOCUMENTS

EP    1309174 B1    1/2013

OTHER PUBLICATIONS

3rd Generation Partnership Project. "Discussion on Maximum RSRP Threshold for ICIC Operation," 3GPP TSG-RAN WG1 #55, R1-084291, Prague, Czech Republic, Nov. 10-14, 2008.

(Continued)

*Primary Examiner* — Nathan Taylor
(74) *Attorney, Agent, or Firm* — Coats and Bennett

(57) ABSTRACT

The present invention provides methods to support scheduling of transmissions from a pico base station or micro base station to a mobile terminal operating in a link imbalance zone where interference from macro base station is present. A method is provided to enable the mobile terminal to detect when it is in a link imbalance zone, and for triggering scheduling restrictions when the mobile terminal is in the link imbalance zone.

10 Claims, 11 Drawing Sheets

(56) References Cited

U.S. PATENT DOCUMENTS

| | | | |
|---|---|---|---|
| 2010/0029282 A1* | 2/2010 | Stamoulis et al. | 455/436 |
| 2010/0080139 A1 | 4/2010 | Palanki et al. | |
| 2010/0099449 A1* | 4/2010 | Borran et al. | 455/501 |
| 2010/0173637 A1* | 7/2010 | Damnjanovic et al. | 455/447 |
| 2010/0177722 A1* | 7/2010 | Guvenc | 370/329 |
| 2010/0238826 A1* | 9/2010 | Borran et al. | 370/252 |
| 2010/0238827 A1* | 9/2010 | Borran et al. | 370/252 |
| 2010/0238884 A1* | 9/2010 | Borran et al. | 370/329 |
| 2011/0080896 A1* | 4/2011 | Krishnamurthy et al. | 370/336 |
| 2011/0190024 A1* | 8/2011 | Seong et al. | 455/522 |
| 2011/0255486 A1* | 10/2011 | Luo et al. | 370/329 |

OTHER PUBLICATIONS

Guo, Y. et al. "Class-Based Quality of Service over Air Interfaces in 4G Mobile Networks," Fourth-Generation Mobile Initiatives and Technology, IEEE Communications Magazine, IEEE Service Center, Mar. 1, 2002, pp. 132-137, vol. 40, No. 3, Piscataway, New Jersey.

3rd Generation Partnership Project. "Benefits of Blank Subframes in Rel-9." 3GPP TSG-RAN WG1 #58, R1-093103, Shenzhen, China, Aug. 24-28, 2009.

3rd Generation Partnership Project. "Positioning Sub-frame Muting for OTDOA Measurements." 3GPP TSG RAN1 #58, R1-093406, Shenzhen, PR China, Aug. 24-28, 2009.

3rd Generation Partnership Project. "LTE Non-CA Based HetNet Support." 3GPP TSG RAN WG1 Meeting #60bis, F1-101982, Beijing, China, Apr. 12-16, 2010.

3rd Generation Partnership Project. "CSI RS Muting and Interference Measurement." 3GPP TSG RAN WG1 Meeting #60bis, R1-102055, Beijing, China, Apr. 12-16, 2010.

Chan, T., et al., "Visual Pattern BTC with Two Principle Colors for Color Images," Department of Electrical and Electronic Engineering, The Hong Kong University of Science and Technology, IEEE Communications Magazine, 1995, pp. 235-238.

Yang, C., et al., "Color Image Compression by Moment-Preserving and Block Truncation Coding Techniques," IEEE Transactions on Communications, vol. 45, No. 12, Dec. 1997, pp. 1513-1516.

* cited by examiner

DOWNLINK SCHEDULING IN HETEROGENEOUS NETWORKS

RELATED APPLICATION

This application claims the benefit of U.S. Provisional Patent Application 61/357,264, filed Jun. 22, 2010, titled "Scheduling and Signalling Method in Heterogeneous Network," which is incorporated herein by reference.

TECHNICAL FIELD

The present invention relates generally to heterogeneous networks comprising a mixture of low power and high power nodes with overlapping coverage and, more particularly, to downlink scheduling in a heterogeneous network.

BACKGROUND

The new Third Generation Partnership Project (3GPP) standard known as Long Term Evolution (LTE) (3GPP LTE Rel-10) supports heterogeneous networks. In heterogeneous networks, a mixture of cells of different size and overlapping coverage areas are deployed. For example, a heterogeneous network may deploy Pico cells served by relatively low power nodes within the coverage area of a macro cell served by relatively high power base stations. Heterogeneous networks could also deploy relatively low-power home base stations and relays to provide improved service in indoor areas. The aim of deploying low power nodes, such as pica base stations, home base stations, and relays, within a macro cell where coverage is provided by a high power base station is to improve system capacity by means of cell splitting gains, as well as to provide users with wide area experience of very high speed data access throughout the network. Heterogeneous deployment schemes represent one alternative to deployment of denser networks of macro cells and are particularly effective to cover traffic hotspots, i.e., small geographical areas with high user densities served by lower power nodes.

In heterogeneous networks, there may be a large disparity in output power of the low power nodes compared to the base stations serving macro cells. For example, the output power of the base stations in the macro cells may be in the order of 46 dBm, while the output power of the low power nodes in the pico cells may be less than 30 dBm. In some heterogeneous networks, the macro cells and pica cells operate on the same carrier frequencies, and inter-cell interference coordination (ICIC) techniques are used to deal with interference when mobile terminals are operating in areas served by both macro cells and pico cells. For example, scheduling restrictions may be applied where a macro base station is prevented from transmitting in certain subframes, which may be referred to as "blank" subframes. The pico cells can use these blank subframes to transmit data to mobile terminals operating in a link imbalance zone near the cell edge of the pico cells without interference from the macro base stations.

Although scheduling restrictions may be applied by the base station to implement ICIC, there is currently no way to notify the mobile terminals about such scheduling restrictions. Thus, the mobile terminals must decode the Physical Downlink Control Channel (PDCCH) in all subframes, which may be unnecessary if scheduling restrictions apply to the mobile terminal. Also, because the received signals from the macro cell may be up to 10 dB stronger than the received signals from the pico cell, the mobile terminal might not be able to maintain synchronization with the pico cell and thus unable to decode the PDCCH transmitted by the pico cell. Another drawback is that there is currently no method to detect when a mobile terminal is in a link imbalance zone and thus should be subject to scheduling restrictions.

SUMMARY

The present invention provides mechanisms for detecting when a mobile terminal is in a link imbalance zone and thus subject to scheduling restrictions. The detection can be made either by the mobile terminal, which then informs the network that a change in scheduling should apply, or by a pico cell. When scheduling restrictions apply, the downlink transmissions to the mobile terminal may be restricted to a predetermined subset of the subframes, referred to herein as the restricted subframes. The macro cells avoid transmission of the PDCCH and user data in the restricted subframes. The change between restricted and unrestricted scheduling modes for mobile terminals served by a pico cell can be signaled in several ways, for instance through Radio Resource Control (RRC) or (MAC) signaling.

Additionally, the present invention provides a mechanism to identify restricted subframes to the mobile terminal so that the mobile terminal does not need to decode the PDCCH in unrestricted subframes when it is operating in the link imbalance zone. Scheduling information is transmitted to the mobile terminal to indicate the subframes that can be used to transmit to mobile terminals when scheduling restrictions apply. Thus, when the mobile terminal is within the link imbalance zone and thus subject to scheduling restrictions, the mobile terminal does not need to monitor the PDCCH in other subframes.

Exemplary embodiments of the invention comprise methods implemented by a mobile terminal in a heterogeneous communication network including first and second base stations with overlapping coverage. One embodiment comprises a method implemented by a mobile terminal of decoding a control channel transmitted by a pico base station cell. The mobile terminal receives scheduling information indicating one or more restricted subframes for downlink transmission by said first base station in said area of overlapping coverage. When the mobile terminal is served by the pico base station and is within a link imbalance zone, the mobile terminal decodes the control channel transmitted by said pico base station only in said restricted subframes.

Other embodiments of the invention relate to a mobile terminal configured to operate in a heterogeneous network. In one embodiment, the mobile terminal comprises a transceiver for communicating with a base station in a mobile communication network; and a control circuit to control said transceiver. The control circuit receives scheduling information indicating one or more subframes restricted for downlink transmission by said first base station in said area of overlapping coverage. When the mobile terminal is served by a pico base station and is in a link imbalance zone, the mobile terminal decodes the control channel transmitted by said pico base station in said restricted subframes when said mobile terminal is in said link imbalance zone.

Another embodiment of the invention comprises methods implemented by a mobile terminal in a heterogeneous network of triggering a subframe scheduling change. In one exemplary method, the mobile terminal measures a first signal quality of signals transmitted by a pica base station in subframes restricted for downlink transmission by the pico base station; measuring a second signal quality of signals transmitted by a macro base station. The mobile terminal compares the first and second signal quality measurements, and transmits a measurement report to a network node when the comparison meets a predetermined condition.

Other embodiments of the invention relate to a mobile terminal in a heterogeneous network and configured to trigger a subframe scheduling restriction. In one embodiment, the mobile terminal comprises a transceiver for communicating with a base station in a mobile communication network; and a control circuit to control said transceiver. The control circuit measures a first signal quality of signals transmitted by the pico base station in subframes restricted for downlink transmission by the pico base station, and measures a second signal quality of signals transmitted by a macro base station. The control circuit compares the first and second signal quality measurements; and transmits a measurement report to a network node when said comparison meets a predetermined condition.

Other embodiments of the invention comprise methods implemented by a pica base station in a heterogeneous network to reduce inter-cell interference. In one exemplary method, the pico base station determines an estimated path loss between said pico base station and a mobile terminal, and schedules downlink transmissions from the pica base station to the mobile terminal based on said estimated path loss.

Still other embodiments of the invention comprise a pico base station in a heterogeneous network configured to reduce inter-cell interference. In one exemplary embodiment, the pica base station comprises a transceiver for communicating with one or more mobile terminals, and a control circuit to control said transceiver. The control circuit is configured to determine an estimated path loss between the pico base station and the mobile terminal; and to schedule downlink transmissions from the pico base station to the mobile terminal based on the estimated path loss.

Other embodiments of the invention comprise methods implemented by a pico base station in a heterogeneous network to reduce inter-cell interference. In one exemplary method, the pico base station receives a measurement report from a mobile terminal. The measurement report includes measurements of signals transmitted by the pico base station and at least one neighboring macro base station. Based on the measurement report, the pico base station determines whether the mobile terminal is in a link imbalance zone. If the mobile terminal is in a link imbalance zone, the base station schedules downlink transmissions to the mobile terminal in restricted subframes only.

Still other embodiments of the invention comprise a pico base station in a heterogeneous network configured to reduce inter-cell interference. In one exemplary embodiment, the pico base station comprises a transceiver for communicating with one or more mobile terminals, and a control circuit to control said transceiver. The control circuit is configured to receive a measurement report from a mobile terminal. The measurement report includes measurements of signals transmitted by the pico base station and at least one neighboring macro base station. Based on the measurement report, the control circuit determines whether the mobile terminal is in a link imbalance zone. If the mobile terminal is in a link imbalance zone, the base station schedules downlink transmissions to the mobile terminal in restricted subframes only.

Other embodiments of the invention comprise methods implemented by a pico base station in a heterogeneous network to reduce inter-cell interference. In one exemplary method, the pica base station receives an indication from a mobile terminal that mobile terminal is in a link imbalance zone and, responsive to the indication, begins scheduling downlink transmissions to the mobile terminal in restricted subframes only.

Still other embodiments of the invention comprise a pico base station in a heterogeneous network configured to reduce inter-cell interference. In one exemplary embodiment, the pico base station comprises a transceiver for communicating with one or more mobile terminals, and a control circuit to control said transceiver. The control circuit is configured to receive an indication from a mobile terminal that mobile terminal is in a link imbalance zone. In response to the indication, the base stations schedules downlink transmissions to the mobile terminal in restricted subframes only.

DETAILED DESCRIPTION

Figure 1:
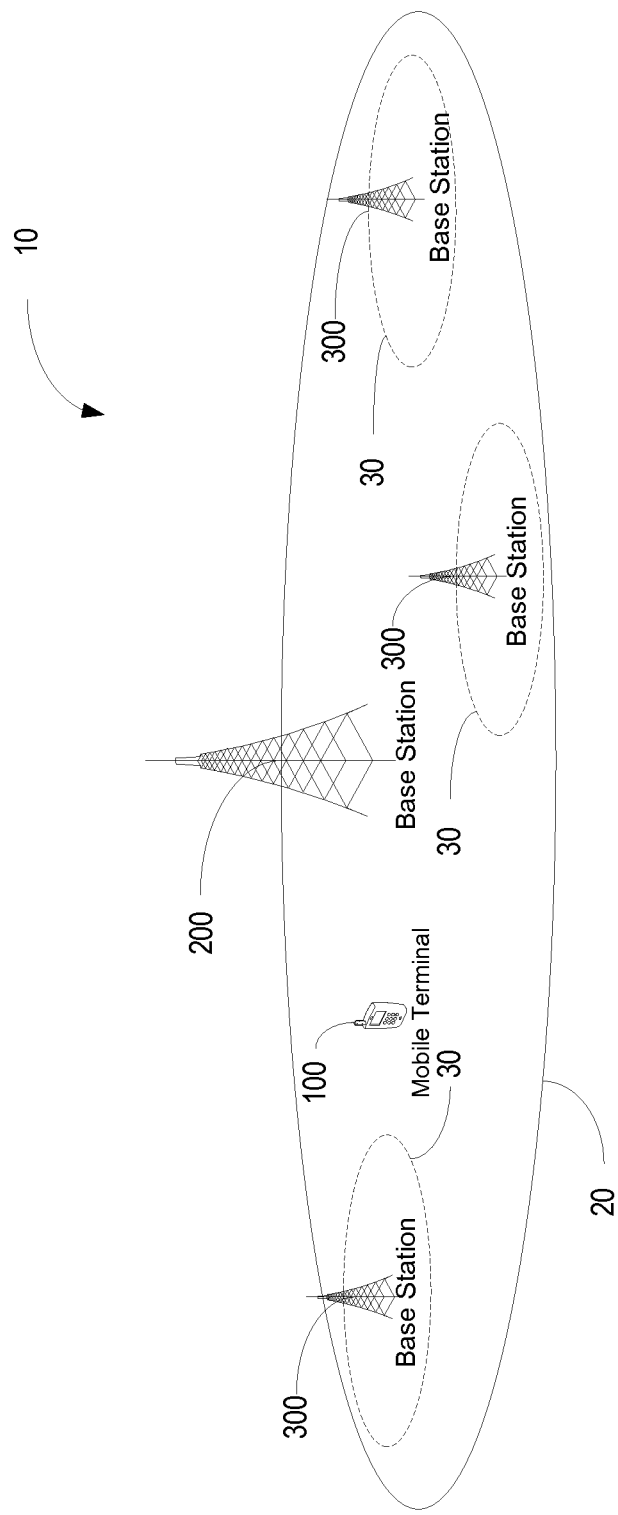
FIG. 1 illustrates macro and pica cell deployment in a mobile communication network.

Turning now to the drawings, FIG. 1 illustrates an exemplary heterogeneous communication network 10 according to one exemplary embodiment of the present invention. The present invention is described in the context of a Long-Term Evolution (LTE) network, which is specified in Release 10 of the LTE standard. However, those skilled in the art will appreciate that the invention may be applied in heterogeneous networks using other communication standards.

The communication network 10 comprises a plurality of high power access nodes providing radio coverage in respective macro cells 20 of the communication network 10. In the exemplary embodiment shown in FIG. 1, three pico cells 30 served by low power access nodes 300 are deployed within the macro cell 20. The low power access nodes may comprise pico base stations or home base stations. For convenience, the high power and low power access nodes 200, 300 will be referred to herein as the macro base stations 200 and pico base stations 300. The output power of the high power macro base stations 200 is presumed to be in the order of 46 dBm, while the output power of the pico base stations 300 is presumed to be less than 30 dBm.

In some heterogeneous networks 10, frequency separation between the different layers, i.e., macro and pico cells 20, 30 in FIG. 1, is used to avoid interference between the macro cells 20 and pico cells 30, respectively. When frequency separation is used, the macro base stations 200 and pico base stations 300 operate on different non-overlapping carrier frequencies to reduce interference between the macro and pico layers. Cell splitting gains are obtained when the radio resources in the pico cell 30 can be simultaneously used when the macro cell 20 is transmitting. However, frequency separation may lead to resource-utilization inefficiency. For example, when the pico cell 30 is lightly loaded so that its resources are not fully utilized, it may be more efficient to assign all carrier frequencies to the macro cell 20. However, the split of carrier frequencies between layers is typically static.

In some heterogeneous networks 10, radio resources on same carrier frequencies are shared by the macro and pica layers by coordinating transmissions in the overlapping macro and pico cells 20, 30. This type of coordination is referred to as inter-cell interference coordination (ICIC). Certain radio resources are allocated for the macro cells 20 during specified time periods and the remaining resources can be accessed by pico cells 30 without interference from the macro cell 20. Depending on the load distribution across the layers, the resource split can change over time to accommodate different load distributions. In contrast to the splitting of carrier frequencies, sharing radio resources across layers using some form of ICIC can be made more or less dynamic depending on the implementation of the interface between the access nodes. In LTE, an X2 interface has been specified in order to exchange different types of information between base stations 200, 300. One example of such information exchange is that a base station 200, 300 can inform other base stations 200, 300 that it will reduce its transmit power on certain resources.

Time synchronization between base stations 200, 300 is required to ensure that ICIC across macro and pico layers will work efficiently in heterogeneous networks. Time synchronization is particularly important for time domain based ICIC schemes where resources on the same carrier are shared by macro and pico base stations.

Figure 2:
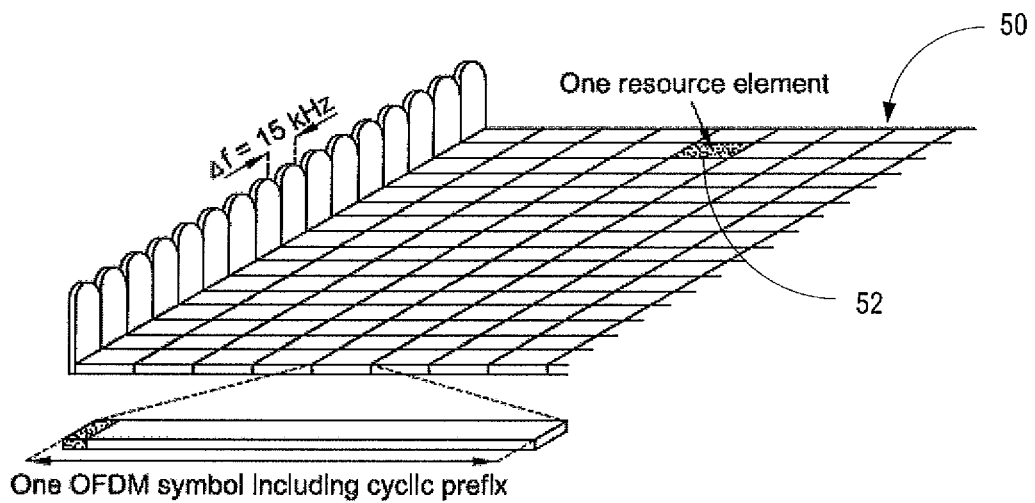
FIG. 2 illustrates an exemplary downlink physical resource in an exemplary Orthogonal Frequency Division Multiplexing (OFDM) network.

LTE uses Orthogonal Frequency Division Multiplexing (OFDM) in the downlink and Discrete Fourier Transform (DFT) spread OFDM in the uplink. The basic LTE downlink physical resource can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain; the physical resources are divided into adjacent subcarriers with a spacing of 15 kHz. The number of subcarriers varies according to the allocated system bandwidth. The smallest element of the time-frequency grid 50 is a resource element. A resource element comprises one OFDM subcarrier during one OFDM symbol interval.

Figure 3:
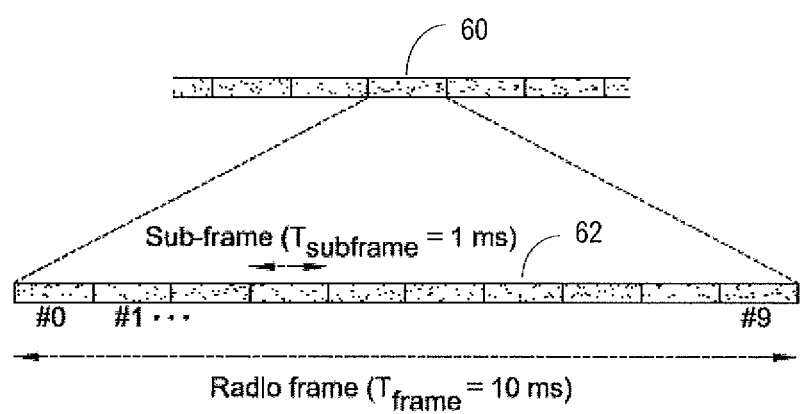
FIG. 3 illustrates an exemplary time-domain structure in an exemplary OFDM network.

In LTE systems, data is transmitted to the mobile terminals over a downlink transport channel known as the Physical Downlink Shared Channel (PDSCH). The PDSCH is a time and frequency multiplexed channel shared by a plurality of mobile terminals. As shown in FIG. 3, the downlink transmissions are organized into 10 ms radio frames 60. Each radio frame comprises ten equally-sized subframes 62. For purposes of scheduling users to receive downlink transmissions, the downlink time-frequency resources are allocated in units called resource blocks (RBs). Each resource block spans twelve subcarriers (which may be adjacent or distributed across the frequency spectrum) and one 0.5 ms slot (one half of one subframe). The term "resource block pair" refers to two consecutive resource blocks occupying an entire one millisecond subframe.

Within a cell 20, 30, the base station 200, 300 dynamically schedules downlink transmissions to the mobile terminals 100 based on channel state and quality information (CSI, CQI) reports from the mobile terminals 100 on the Physical Uplink Control Channel (PUCCH) or Physical Uplink Shared Channel (PUSCH). The CQI reports indicate the instantaneous channel conditions as seen by the receiver. In each subframe, the base station 200, 300 transmits downlink control information (DCI) identifying the mobile terminals 100 that have been scheduled to receive data (hereinafter the scheduled mobile terminals) in the current downlink subframe and the resource blocks on which the data is being transmitted to the scheduled terminals. The DCI is typically transmitted on the Physical Downlink Control Channel (PDCCH) in the first one, two, or three OFDM symbols (up to 4 symbols for 1.4 MHz bandwidth systems) in each subframe.

In order to demodulate data transmitted on the downlink, the mobile terminals 100 need an estimate of the channel over which the data is transmitted. To facilitate channel estimation by the mobile terminal 100, the base station 200, 300 transmits reference symbols on the downlink which are known to the mobile terminal 100. By correlating the known reference signals with the received signal, the mobile terminal 100 obtains an estimate of the channel. In LTE, there are two types of reference signals: cell specific reference signals and mobile terminal specific reference symbols. The cell specific reference symbols are usually transmitted in all downlink subframes. The mobile terminal 100 may use the cell specific reference signals for both channel estimation and for performing signal measurements for mobility management purposes. Mobile terminal specific reference symbols may also be transmitted and used for channel estimation.

Figure 4:
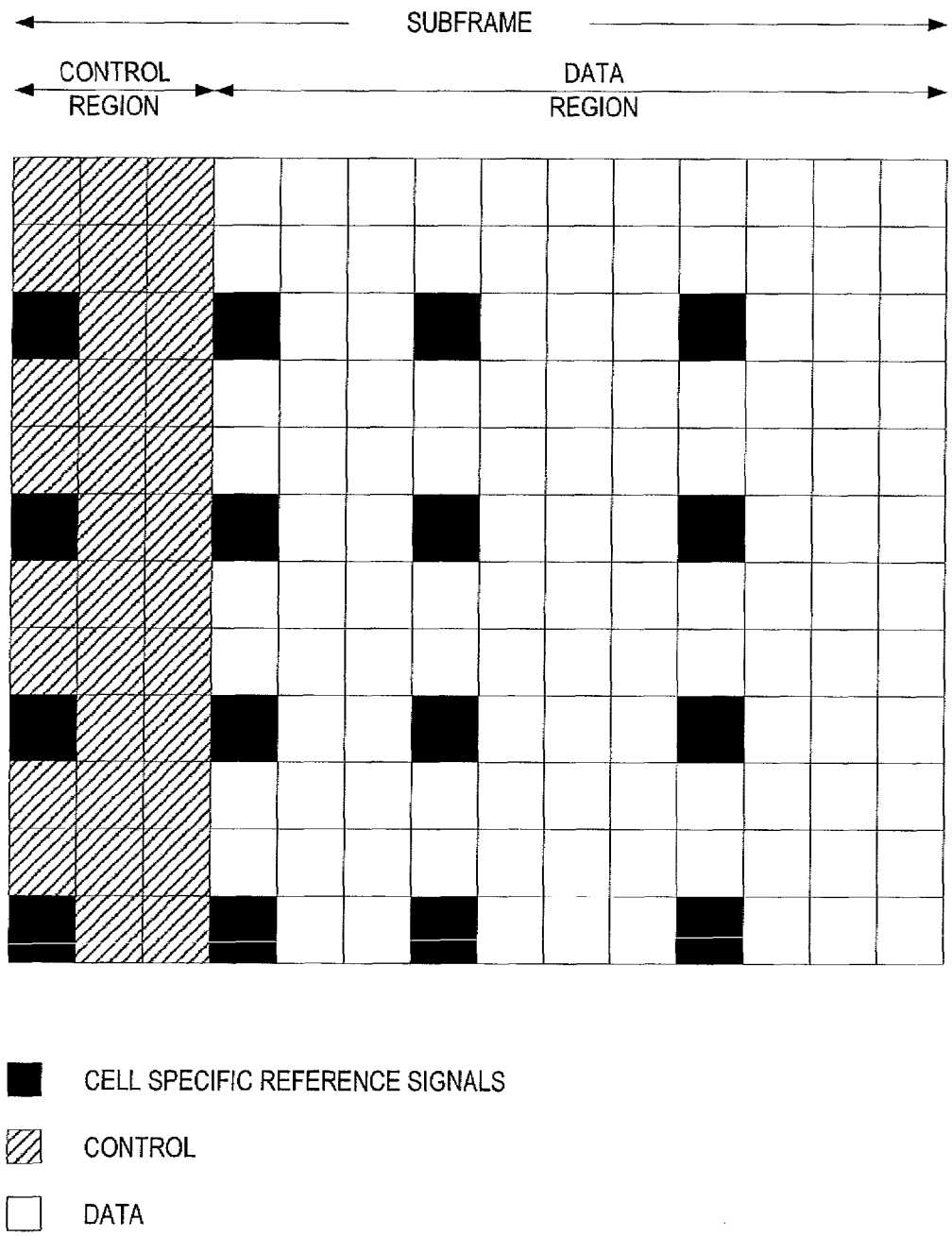
FIG. 4 illustrates an exemplary mapping of LTE physical control channels, data channels and cell specific reference signals within a downlink subframe.

FIG. 4 illustrates the mapping of the physical control channels and cell-specific reference signals in a downlink subframe. As shown in FIG. 4, physical control channels may be transmitted in the first three symbols of a subframe. User data is transmitted in the last eleven symbols, except on resource elements where reference signals are transmitted. In some embodiments, the physical control channels may use less than three symbols, so data transmission can begin in the second or third OFDM symbol. The cell specific reference signals are transmitted on designated subcarriers in the first, fifth, eighth, and twelfth symbol in each subframe.

In order to establish a connection with the LTE network 10, the mobile terminal 100 needs to find and acquire synchronization with a cell 20, 30 within the network 10, read system parameters from a broadcast channel in the cell 20, 30, and perform a random access procedure to establish a connection with the cell 20, 30. The first of these steps is commonly referred to as cell search. To assist the mobile terminal 100 in the cell search procedure, the base station 200 transmits two synchronization signals on the downlink: the Primary Synchronization Signal (PSS) and the Secondary Synchronization Signal (SSS). For LTE radio frame structure type 1 (used for Frequency Division Duplex (FDD) deployments), the PSS and SSS are transmitted within the two last OFDM symbols in the first slot of subframes 0 and 5. For LTE radio frame structure type 2 (used for Time-Division Duplex (TDD) deployments), the SSS is transmitted in the last OFDM symbol of subframe 0 and 5, whereas PSS is transmitted within the third OFDM symbol of subframe 1 and 6. The synchronization signals are transmitted in the center of the system bandwidth, occupying six resource blocks in the frequency domain. The difference in the positions of the synchronization signals in the case of FDD and TDD allows for the detection of the duplex scheme used on a carrier if this is not known in advance.

The synchronization signals transmitted in each cell 20, 30 comprise a specific set of sequences that define the cell identity. There are 504 different physical cell identities (PCIs) defined for LTE, where each PCI corresponds to one specific downlink reference-signal sequence. The PCIs are further divided into 168 cell-identity groups, with three Pas within each group. The LTE standard specifies the location in time and frequency of the synchronization signals. The time-domain positions of the synchronization signals within the frame differ somewhat depending on if the cell 20, 30 is using frequency-division duplex (FDD) or time-division duplex (TDD). By detecting the synchronization signals, the mobile terminal 100 will acquire the timing of a cell 20, 30, and, by observing which of multiple sequences the cell is transmitting, the mobile terminal 100 can identify the cell 20, 30. Once the mobile terminal 100 has acquired frame timing and the PCI of the cell 20, 30, the mobile terminal 100 has identified the cell-specific reference signal and can receive the necessary system information for accessing the cell 20, 30.

A mobile terminal 100 does not carry out cell search only at power-up, i.e., when initially accessing the system. In order to support mobility, the mobile terminals 100 need to continuously search for, synchronize to, and estimate the reception quality of signals transmitted by neighbor cells. The mobile terminals 100 may evaluate the reception quality of signals from the neighbor cells, in comparison to the reception quality of the current serving cell, to determine whether a handover (for mobile terminals 100 in connected mode) or cell re-selection (for mobile terminals 100 in idle mode) should be carried out. For mobile terminals 100 in connected mode, the network 10 makes the handover decision based on measurement reports provided by the mobile terminals 100. As noted previously, the cell specific reference signals may be used by the mobile terminal 100 to perform the measurements.

The measurement reports provided by the mobile terminal 100 may include measurements of the reference signal received power (RSRP) and/or reference signal received quality (RSRQ). Depending on how these measurements, possibly complemented by a configurable offset, are used, the mobile terminal 100 can be connected to the cell 20, 30 with the strongest received power, or the cell 20, 30 with the lowest path loss, or a combination of the two. These selection criteria (received power and path loss) do not necessarily result in the same selected cell 20, 30. Because the output power varies for different types of cells 20, 30, it is possible that, for a given mobile terminal 100, the cells 20, 30 with the highest RSRP and RSRQ measurements and the cells 20, 30 with the lowest path loss are different. This situation is referred to herein as link imbalance.

Figure 5:
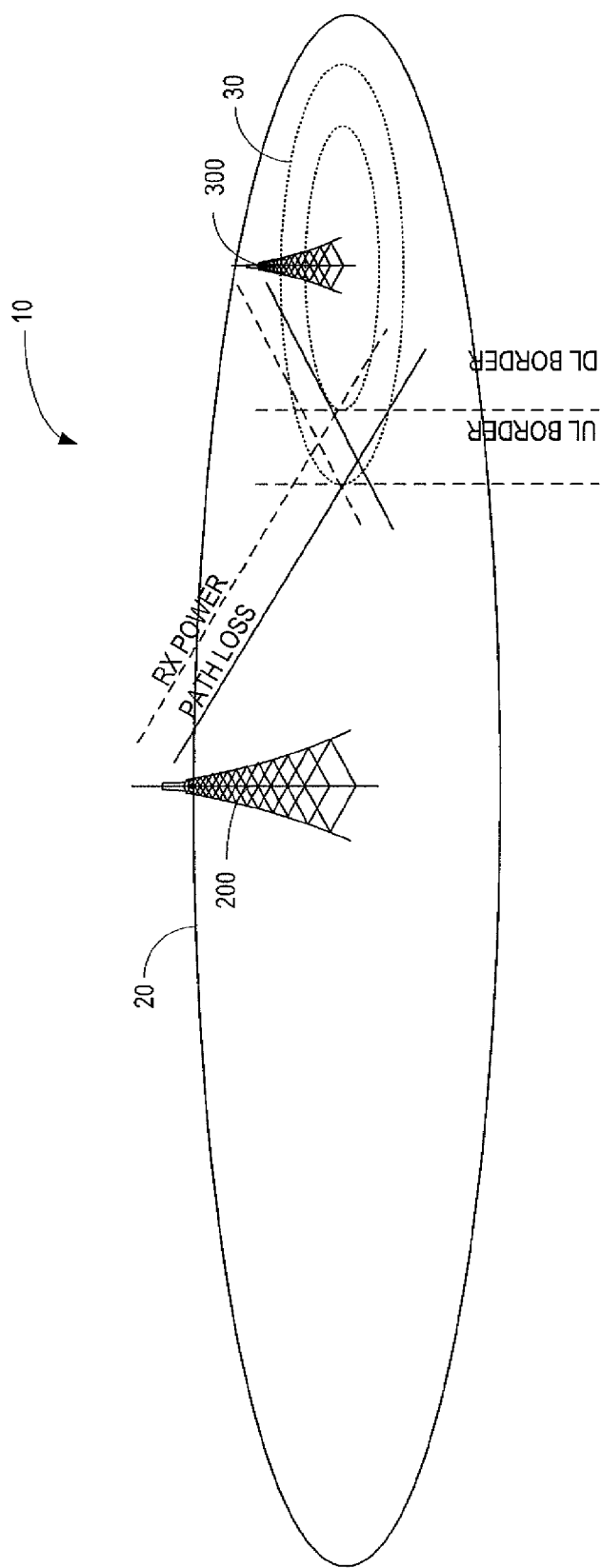
FIG. 5 illustrates link imbalance in a heterogeneous network.

FIG. 5 illustrates how link imbalance can occur in a heterogeneous network 10. It is realistically presumed for purposes of this example that the output power of a pico base station 300 in the pico cell 30 is in the order of 30 dBm or less, while the output power of the macro base station 200 is in the order of 46 dBm. Consequently, when the mobile terminal 100 is operating near the cell edge of the pico cell 30, the received signal strength from the macro cell 20 can be much larger than that of the pico cell 30. However, the path loss to the base station 200 in the macro cell 20 may be greater than the path loss to the pica base station 300 in the pico cell 30.

In FIG. 5, the downlink (DL) border indicates the point at which the received signal strengths from the macro cell 20 and pico cell 30 are equal. The uplink (UL) border indicates the point at which the path losses to the base stations 200, 300 in the macro cell 20 and pico cell 30 respectively are equal. The region between the DL and UL borders is the link imbalance zone. From a downlink perspective, it may be better for a mobile terminal 100 in the link imbalance zone to select a cell 20, 30 based on downlink received power; but from an uplink perspective, it may be better to select a cell 20, 30 based on the path loss because the transmit power of the mobile terminal 100 is limited. In this scenario, it might be preferable from a system perspective for the mobile terminal 100 to connect to the pico cell 30 even if the macro downlink is up to 10-20 dB stronger than the pico cell downlink. However, inter-cell interference coordination (ICIC) between macro and pico layers is necessary when the mobile terminal 100 is operating within the link imbalance zone.

Figure 6:
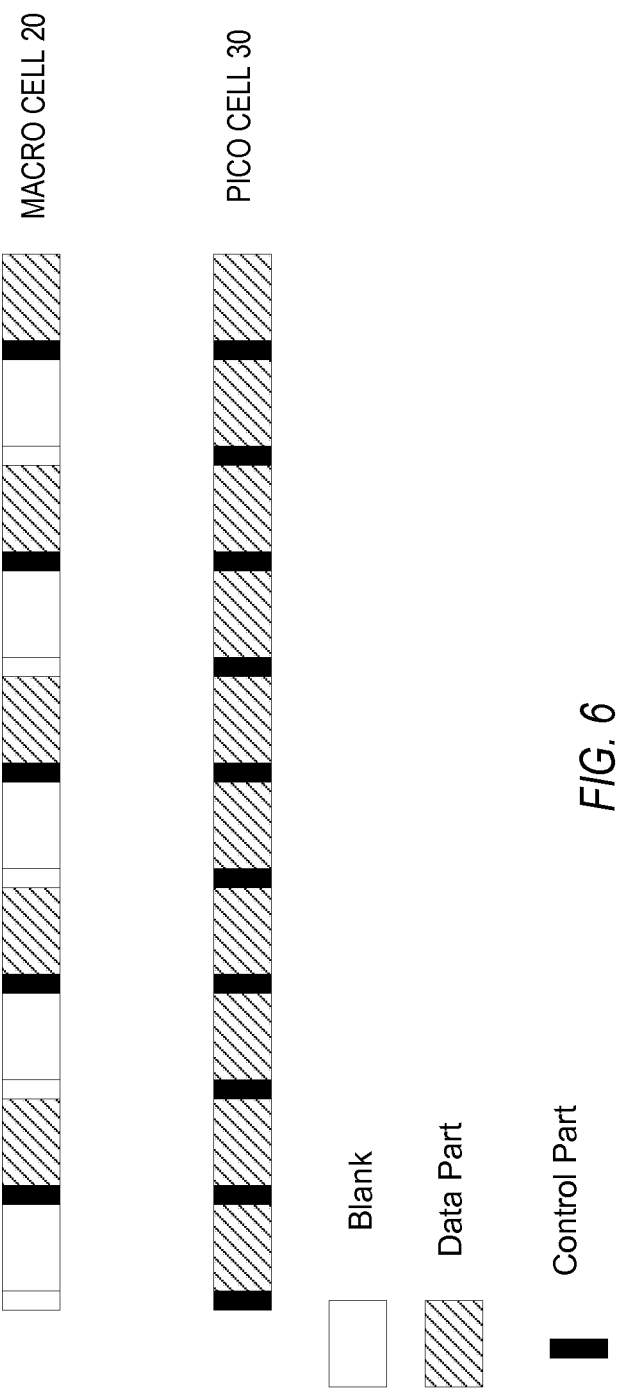
FIG. 6 illustrates inter-cell interference coordination using blank subframes in the downlink.

One approach of providing ICIC across layers is illustrated in FIG. 6, where an interfering macro cell 20 does not transmit PDCCHs, and thus no data, in some subframes. The pico cell 30 is aware of the locations of these "blank" subframes and can schedule downlink transmissions to cell edge mobile terminal 100 (mobile terminals 100 operating within the link imbalance zone) in subframes aligned with the blank subframes at the macro layer 30. For legacy mobile terminals, the macro cell 20 will still need to transmit cell specific reference symbols in all subframes so the blank subframes will not be completely empty. Pico cell users operating inside the DL border can be scheduled in all subframes.

One drawback to the ICIC approach shown in FIG. 6 is that the mobile terminal 100 may not be aware of scheduling restrictions and does not know what downlink subframes to monitor. Thus, the mobile terminal 100 typically decodes the PDCCH in all subframes, which may be unnecessary if subframe scheduling restrictions apply to the mobile terminal 100. Also, because the received signals from the macro cell may be up to 10 dB stronger than the received signals from the pico cell 30, the mobile terminal 100 might not be able to maintain synchronization with the pico cell 30 and thus unable to decode the PDCCH transmitted by the pico cell 30. Another drawback is that there is currently no method to detect when the mobile terminal 100 is in a link imbalance zone and therefore when scheduling restrictions should be applied.

In embodiments of the present invention, scheduling restrictions may be applied to a mobile terminal 100 when the mobile terminal 100 is operating in a link imbalance zone. When subframe scheduling restrictions apply, the downlink transmissions to the mobile terminal 100 may be restricted to a predetermined subset of the subframes, referred to herein as the restricted subframes. The macro cells 20 avoid transmission of the PDCCH and user data in the restricted subframes. Scheduling information is transmitted to the mobile terminal 100 to indicate the subframes that can be used to transmit to mobile terminals 100 when scheduling restriction apply. When the mobile terminal 100 is within the link imbalance zone, and thus subject to scheduling restrictions, the mobile terminal 100 does not need to monitor the PDCCH in other subframes. Also, a mechanism is provided for detecting when a mobile terminal 100 is in the link imbalance zone. The detection can be made either by the mobile terminal 100, which then informs the network that a change in scheduling should apply, or by the pico base station 300 itself. The change of scheduling can be signaled in several ways, for instance through Radio Resource Control (RRC) or (MAC) signaling.

Figure 7:
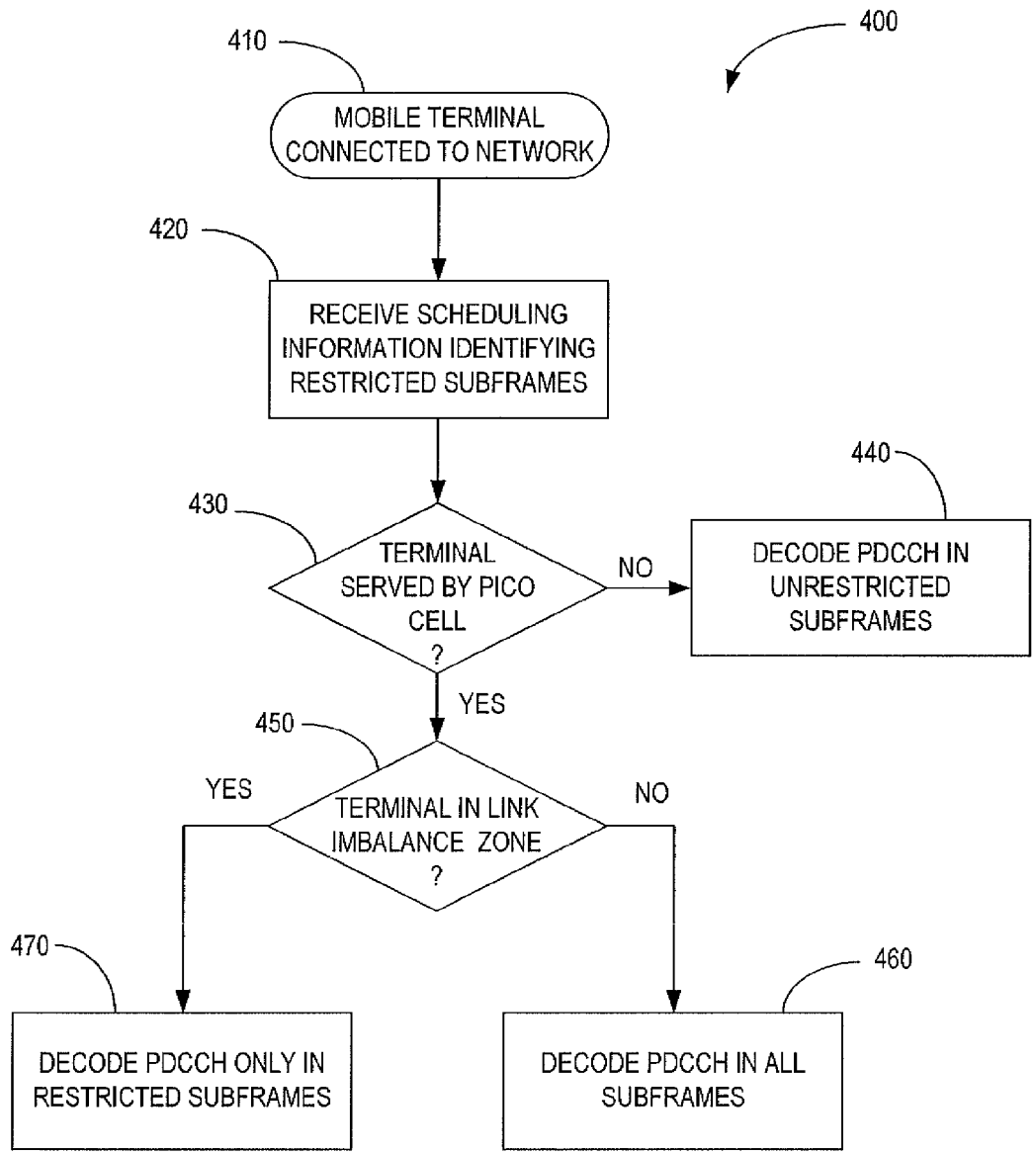
FIG. 7 illustrates an exemplary method performed by a mobile terminal of decoding a control channel.

FIG. 7 illustrates an exemplary method 400 implemented by a mobile terminal 100 of decoding a control channel. The procedure begins when the mobile terminal 100 is connected to a base station 200, 300 in the network (block 410). The mobile terminal 100 could be connected to either a macro base station 200 or pico base station 300. While the mobile terminal 100 is connected, the mobile terminal 100 receives scheduling information identifying restricted subframes used by a pico cell 30 to transmit downlink data to mobile terminals 100 operating in a link imbalance zone (block 420). The scheduling information can be transmitted from either the macro cell 20 or the pico cell 30. For example, the scheduling information may be received by the mobile terminal 100 as an RRC message before or during a handover from a macro cell 20 to a pico cell 30. The mobile terminal 100 could also read the scheduling information on a broadcast channel (MIB or SIB) broadcast by the macro cell 20 or pico cell 30.

When the mobile terminal 100 connects with a base station 200, 300, the mobile terminal 100 determines whether it is connected to a macro base station 200 or pica base station 300 (block 430). This determination should be made each time the mobile terminal 100 moves between cells 20, 30. If the serving base station 200, 300 is a macro base station 300 and scheduling restriction apply because of nearby pico cells 30, the mobile terminal 100 may decode the PDCCH only in the unrestricted subframes (block 440). Because the PDCCH is not transmitted by the macro cells 20 in the restricted subframes, there is no need to decode the PDCCH in the restricted subframes. If there are no scheduling restrictions imposed on the macro cell 20, the mobile terminal 100 should decode the PDCCH in all subframes.

If the mobile terminal 100 is served by a pico base station 300, the mobile terminal 100 next determines if it is in a link imbalance zone (block 450). The mobile terminal 450 may determine itself whether it is in a link imbalance zone or, alternatively, the network may make the determination and transmit a control signal to the mobile terminal 100 to indicate when it is in a link imbalance zone. In the later case, the mobile terminal 100 makes the determination based on the control signals received from the serving pico base station 300. If the mobile terminal 100 is not in a link imbalance zone, the mobile terminal 100 decodes the PDCCH in all subframes (block 460). On the other hand, if the mobile terminal 100 is in a link imbalance zone, the mobile terminal decodes the PDCCH only in the restricted subframes (block 470).

Figure 8:
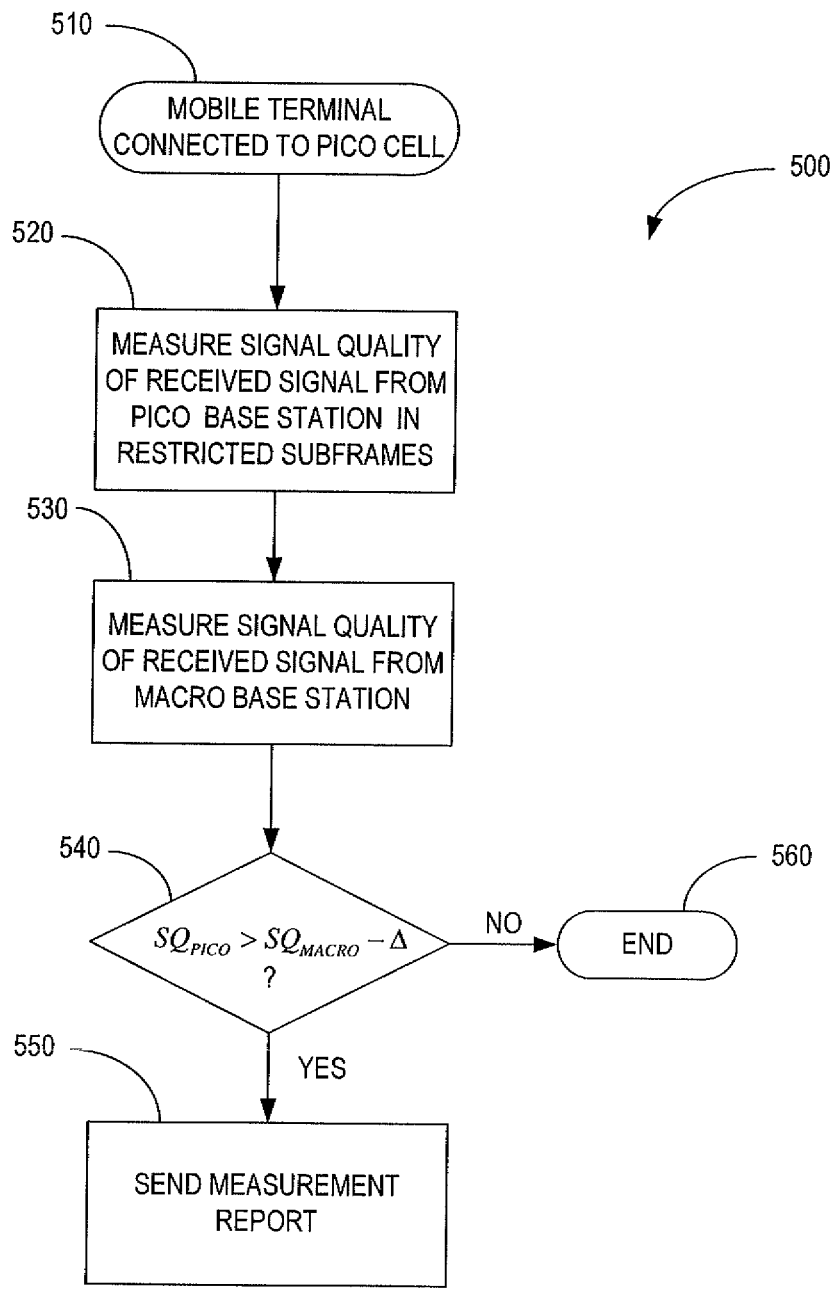
FIG. 8 illustrates an exemplary method implemented by a mobile terminal for triggering subframe scheduling restrictions.

FIG. 8 illustrates an exemplary measurement reporting procedure 500 for implementing subframe scheduling restrictions. This procedure 500 is performed by a mobile terminal 100 when the mobile terminal 100 is being served by a pico cell 30 (block 510). The general idea is for the mobile terminal 100 to perform signal quality measurements on both macro cells 20 and pico cells 30 and trigger scheduling changes by sending a measurement report if certain conditions are met. The measurement procedure shown in FIG. 8 begins with the assumption that scheduling restrictions apply, although the reverse could be assumed in some circumstances as described below. The mobile terminal 100 measures on a regular basis (example once every 40 ms) the received signal strength (RSRP or RSRQ for instance) of signals transmitted by the pico cell 20 in the restricted subframes (block 520).

The mobile terminal 100 also on a regular basis measures the received signal strength on neighboring cells, especially macro cells 20 having coverage areas that overlap with the pico cell 20 (block 530). Preferably the measurements are done in unrestricted subframes; however, the invention is not limited to that case.

The mobile terminal 100 compares the signal strength of the received signals from the pico cell 30 to the received signal strength of the signals from the macro cell 30 (block 540). For mobile terminals 100 served by pico cells 30, reasonable downlink performance in the unrestricted subframes can be achieved if the RSRP of the pico cell 30 is about 3-4 dB lower than RSRP of the macro cell 20. Thus, the value of $\Delta$ should be in the range of 2-5 dB. If the signal strength of the received signals from the pico cell 30 is sufficiently large compared to the received signal strength of the signals from the macro cell 30, the mobile terminal 100 sends a measurement report to the network to trigger a scheduling change (block 550). The measurement report could be transmitted, for example, as part of Medium Access Control (MAC) or RRC signaling. The pico base station 300 receiving the measurement report may change the scheduling strategy and inform the mobile terminal 100 via RRC or MAC signaling. If the signal strength of the pico cell 30 is not strong enough based on the decision criteria, the procedure ends without the mobile terminal 100 sending a measurement report, in which case no change in scheduling will be made (block 560).

If the mobile terminal 100 is operating without scheduling restrictions, the mobile terminal 100 may continue to monitor the signal strength of the macro cells 20 and pico cells 30. The same decision criteria as shown in FIG. 8 may be applied. However, in this case, the mobile terminal 100 sends a measurement report when the decision criteria is no longer met to trigger another scheduling change.

Figure 9:
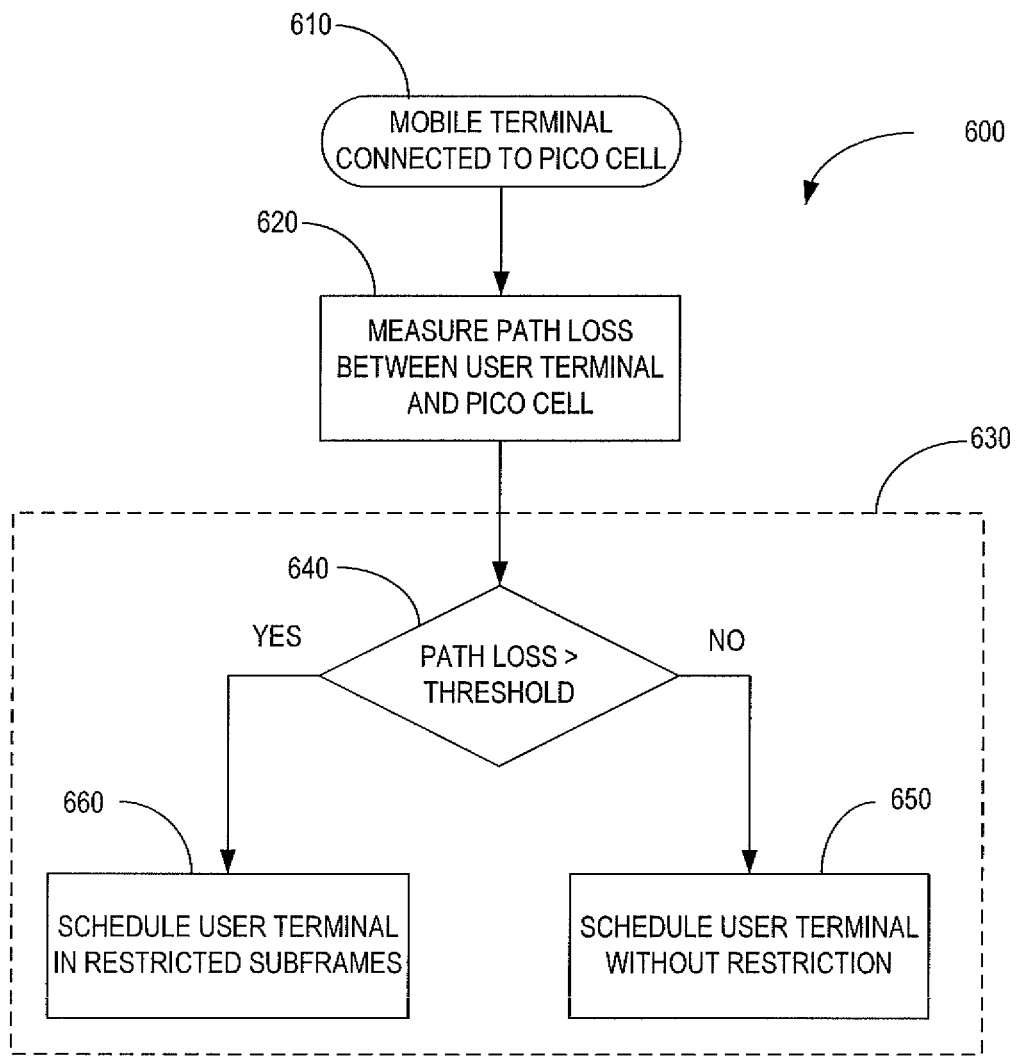
FIG. 9 illustrates an exemplary scheduling method implemented by a network node for determining whether to apply subframe scheduling restrictions.

FIG. 9 illustrates an exemplary scheduling procedure 600 implemented by a network node, e.g., pico base station 300. This procedure 600 is performed when the mobile terminal 100 is being served by a pico cell 30 (block 610). The general idea is for the network node to measure or otherwise determine the path loss between the mobile terminal 100 and pico cell 30 (block 620), and to trigger scheduling changes based on the path loss (block 630). When the mobile terminal 100 is served by a pico cell 30, the pico base station 300 measures the path loss from the mobile terminal 100 (block 620). The path loss could be estimated in several ways. For example, the mobile terminal 100 may transmit sounding reference symbols on the uplink. The pico base station 300 may send transmit power control commands (TPC) to the mobile terminal 100 to control the transmit power of the sounding reference signals. In LTE, the TPC could include explicit values for the mobile terminal transmit power. The pica base station 300 can then determine the path loss based on the received signal strength. Based on the path loss, the pico base station 300 determines whether the mobile terminal 100 could be scheduled without restrictions. For example, the pico base station 300 may compare the path loss to a threshold (block 640). If the path loss is less than the threshold, the pico base station 300 may schedule the mobile terminal in any subframes (block 650). On the other hand, if the path loss is greater than the threshold, the pico base station 300 may decide to schedule the mobile terminal 100 only in the restricted subframes (block 660). When a scheduling change is made, the mobile terminal 100 is informed via RRC or MAC signaling as described above.

Figure 10:
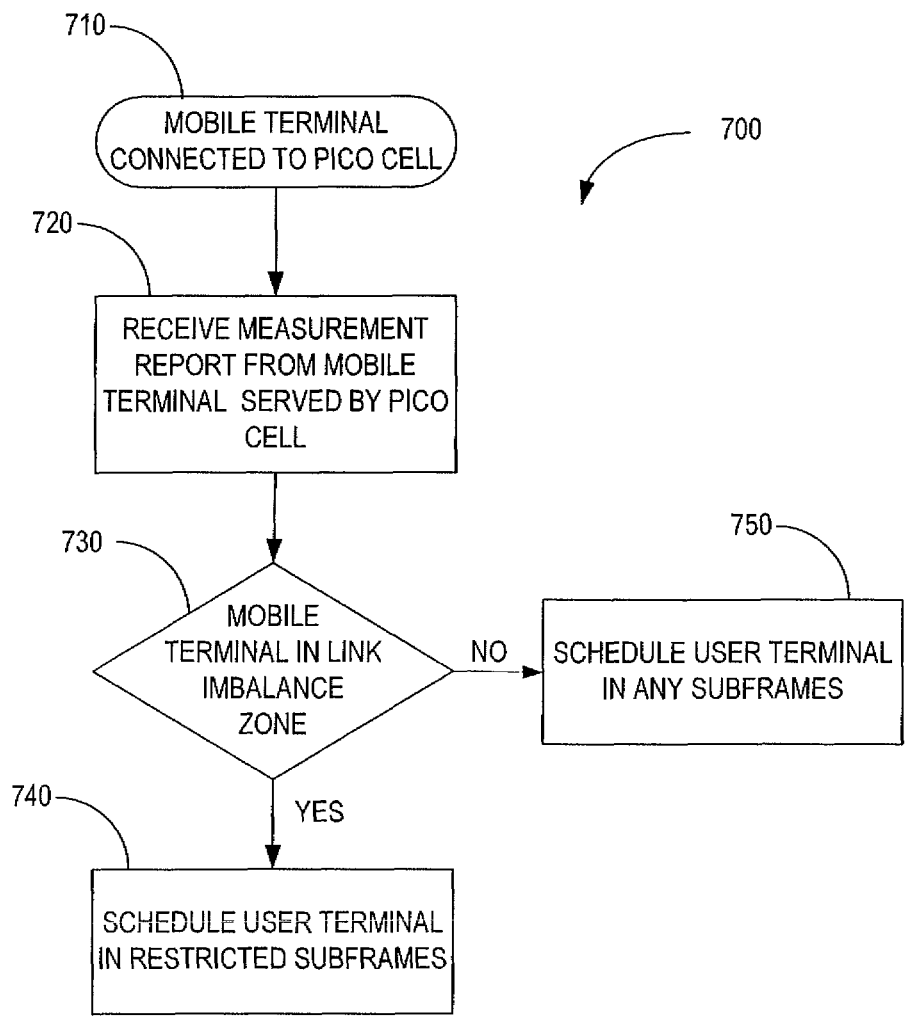
FIG. 10 illustrates another exemplary scheduling method implemented by a network node for determining whether to apply subframe scheduling restrictions based on a measurement report from the mobile terminal.

FIG. 10 illustrates an alternate procedure 700 implemented by a pico base station 300 for determining when scheduling restrictions should be applied to a mobile terminal 100 served by the pico base station 300. This procedure 700 is performed when the mobile terminal 100 is being served by a pico cell 30 (block 710). The basic idea in this embodiment is for the mobile terminal 100 to monitor the signal strength of signals from the macro base station 200 and pico base station 300, and transmit a measurement report to the pico base station (block 720). Based on the measurement report, the pico base station 300 may determine whether the mobile terminal is in a link imbalance zone (block 730). If so, the As previously noted, the pico base station 300 may schedule downlink transmissions to the mobile terminal 100 only in the restricted subframes when the mobile terminal 100 is in the link imbalance zone (block 740). Otherwise, the pico base station 300 may schedule the mobile terminal in any subframes. When a scheduling change is made, the mobile terminal 100 is informed via RRC or MAC signaling as described above.

Figure 11:
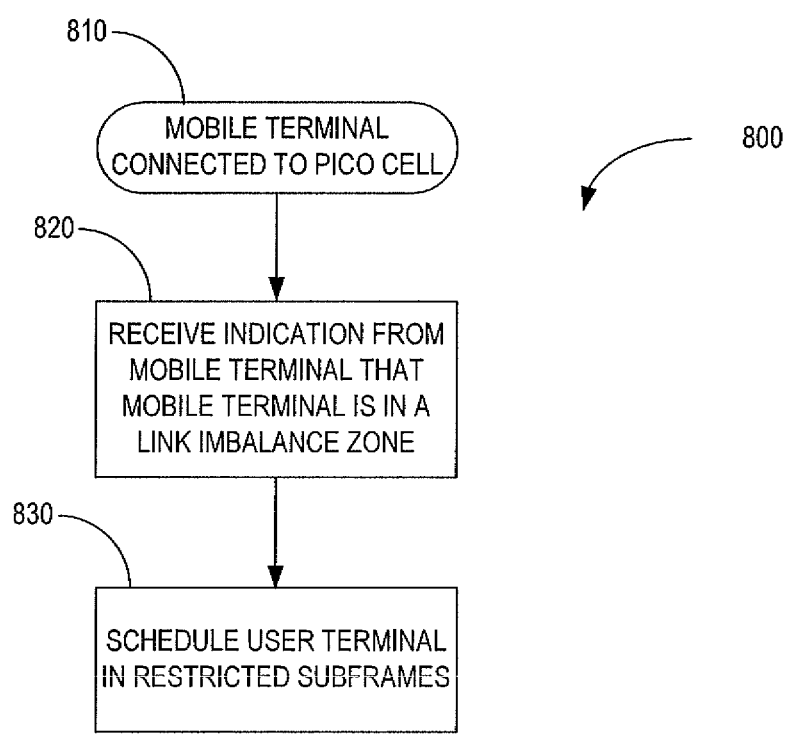
FIG. 11 illustrates another exemplary scheduling method implemented by a network node for determining whether to apply subframe scheduling restrictions based on an indication from the mobile terminal.

FIG. 11 illustrates an alternate procedure 800 implemented by a pico base station 300 for determining when scheduling restrictions should be applied to a mobile terminal 100 served by the pico base station 300. This procedure 700 is performed when the mobile terminal 100 is being served by a pico cell 30 (block 810). The basic idea in this embodiment is for the mobile terminal 100 to monitor the signal strength of signals from the macro base station 200 and pico base station 300, and transmit an indication to the pico base station 300 when the mobile terminal is in a link imbalance zone (block 820). As previously noted, the indication may comprise or be included in a measurement report sent by the mobile terminal 100 to the pico base station 300. In response to the indication, the pico base station 300 may schedule downlink transmissions to the mobile terminal 100 only in the restricted subframes (block 830). When a scheduling change is made, the mobile terminal 100 is informed via RRC or MAC signaling as described above.

Figure 12:
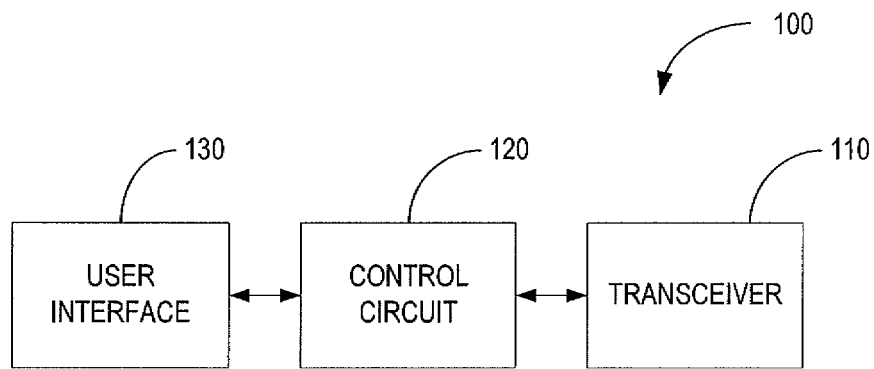
FIG. 12 illustrates an exemplary mobile terminal.

FIG. 12 illustrates an exemplary mobile terminal 100 that implements the extended cell search procedure described herein. The mobile terminal 100 comprises a transceiver 110, control circuit 120, and user interface 130. The transceiver 110 comprises a standard cellular transceiver according to the LTE standard, or other standard now known or later developed, which supports extended cell search procedures. The control circuit 120 controls the operation of the mobile terminal 100 based on instructions stored in memory (not shown). The control circuit 120 may comprise one or more processors, hardware, firmware, or a combination thereof. The control circuit 120 is configured to implement the procedure as shown in FIGS. 4 and 5. Program instructions to implement the extended cell search procedure may be stored in some form of persistent memory (e.g., read-only memory, flash memory, etc.). The control circuit 120 may also include random access memory to store temporary data. The user interface 130 typically comprises a display and one or more input devices to enable the user to interact with and control the mobile terminal 100. The user input devices 130 may include a keypad, touchpad, function keys, scroll wheels, or other similar input devices. If the mobile terminal 100 includes a touchscreen display, the touchscreen display may also function as a user input device.

Figure 13:
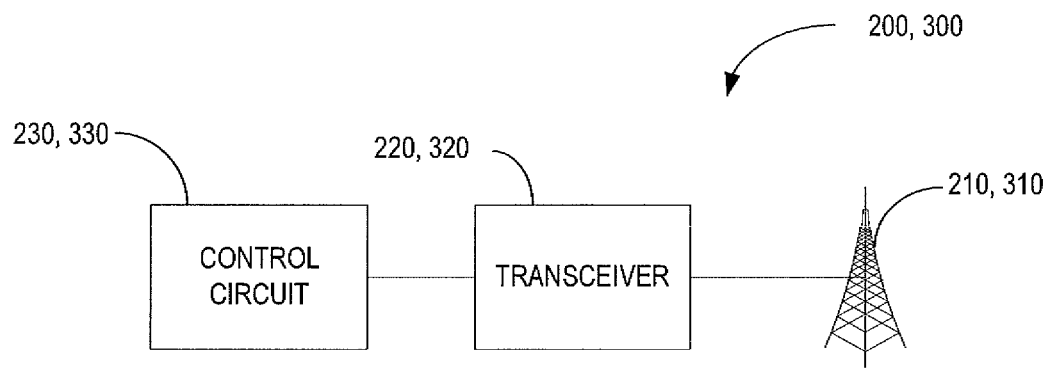
FIG. 13 illustrates an exemplary base station.

FIG. 13 illustrates an exemplary base station 200, 300 for communicating with the mobile terminal 100. The base station 200, 300 comprises an antenna 210, 310 coupled to a transceiver 220, 320 and a control circuit 230, 330. The transceiver 220, 320 comprises a standard cellular transceiver operating according to the LTE standard, or other standard now known or later developed, supporting extended cell search procedures. The control circuit 230, 330 controls the operation of the base station 200, 300. The functions performed by the control circuit 230, 330 include radio resource control and mobility management functions. The control circuit 230, 330 may be implemented by one or more processors, hardware, firmware, or a combination thereof. The control circuit 230, 330 is configured to implement the procedure as shown in FIG. 3. Program instructions to implement the extended cell search procedure may be stored in some form of persistent memory (e.g., read-only memory). The control circuit may also include random access memory to store temporary data.

The present invention provides a method for identifying the restricted subframes to the mobile terminal 100. The invention also provides a method for detecting when the mobile terminal is in a link imbalance zone and for signaling scheduling changes to the mobile terminal 100. Thus, the mobile terminal 100 in the link imbalance zone can decode the PDCCH only in the restricted subframes.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a mobile communication network including first and second base stations with overlapping coverage, a method implemented by a mobile terminal of decoding a control channel transmitted by the first base station, said method comprising:
   receiving scheduling information indicating one or more restricted subframes for downlink transmission by said first base station only in an area of overlapping coverage;
   measuring the signal quality of a received signal from the first base station in the restricted subframes;
   measuring the signal quality of a received signal from the second base station;
   determining that said mobile terminal is within a link imbalance zone located in said area of overlapping coverage of said first and second base stations when the mobile terminal is served by the first base station by one of the following:
      comparing the signal quality of the received signals from the first and second base stations; and
      sending said measured signal qualities to the network in a signal quality report and receiving a scheduling restriction from the network indicating that the mobile terminal is in a link imbalance zone; and
   decoding said control channel only in said restricted subframes when said mobile terminal is in said link imbalance zone.

2. The method of claim 1 wherein receiving scheduling information comprises receiving scheduling information in at least one of a radio resource control message and medium access control message transmitted by one of said first and second base stations.

3. The method of claim 1 wherein receiving scheduling information comprises receiving scheduling information on a broadcast channel transmitted by one of said first and second base stations.

4. A mobile terminal comprising:
   a transceiver for communicating with a base station in a mobile communication network; and
   a control circuit to control said transceiver, said control circuit configured to:
      receive scheduling information indicating one or more restricted subframes for downlink transmission by said first base station only in an area of overlapping coverage between said first base station and a second base station;

measure the signal quality of a received signal from the first base station in the restricted subframes;

measure the signal quality of a received signal from the second base station;

determine that said mobile terminal is within a link imbalance zone located in said area of overlapping coverage of said first and second base stations when the mobile terminal is served by the first base station by one of the following:

comparing the signal quality of the received signals from the first and second base stations; and sending said measured signal qualities to the network in a signal quality report and receiving a scheduling restriction from the network indicating that the mobile terminal is in a link imbalance zone; and decode said control channel only in said restricted subframes when said mobile terminal is in said link imbalance zone.

5. The mobile terminal of claim 4 wherein the control circuit is configured to receive said scheduling information in at least one of a medium access control message and radio resource control message transmitted by one of said first and second base stations.

6. The mobile terminal of claim 4 wherein the control circuit is configured to receive on a broadcast channel transmitted by one of said first and second base stations.

7. In a mobile communication network including first and second base stations with overlapping coverage, a method implemented by said first base station for scheduling downlink transmission to a mobile station, said method comprising:

receiving, from a mobile terminal, a measurement report including measurements of signals transmitted by the first base station being a pico base station and at least one neighboring macro base station; and determining, based on the measurement report, that the mobile terminal is in a link imbalance zone located in said area of overlapping coverage of said first and second base stations; and scheduling downlink transmissions from said first base station to said mobile terminal in restricted subframes only when said mobile terminal is in the link imbalance zone.

8. The method of claim 7 further comprising sending a scheduling update to said mobile terminal to indicate that the mobile terminal is subject to restricted scheduling.

9. A base station in a mobile communication network, said base station comprising:

a transceiver for communicating with one or more mobile terminals; and a control circuit to control said transceiver, said control circuit configured to:

receive, from a mobile terminal, a measurement report including measurements of signals transmitted by the pico base station and at least one neighboring macro base station; and determine, based on the measurement report, that the mobile terminal is in a link imbalance zone located in said area of overlapping coverage of said first and second base stations; and schedule downlink transmissions from said first base station to said mobile terminal in restricted subframes only when said mobile terminal is in the link imbalance zone.

10. The base station of claim 9 wherein the control circuit is further configured to sending a scheduling update to said mobile terminal to indicate that the mobile terminal is subject to restricted scheduling.

* * * * *

UNITED STATES PATENT AND TRADEMARK OFFICE
CERTIFICATE OF CORRECTION

PATENT NO.        : 8,824,383 B2
APPLICATION NO.   : 12/902205
DATED             : September 2, 2014
INVENTOR(S)       : Lindoff et al.

It is certified that error appears in the above-identified patent and that said Letters Patent is hereby corrected as shown below:

On the Title Page, in item (74), under "*Attorney, Agent, or Firm*", in Column 1, Line 1, delete "Coats and Bennett" and insert -- Coats and Bennett PLLC --, therefor.

In the Specification

In Column 1, Line 25, delete "Pico cells" and insert -- pico cells --, therefor.

In Column 1, Line 30, delete "pica base" and insert -- pico base --, therefor.

In Column 1, Line 47, delete "pica cells" and insert -- pico cells --, therefor.

In Column 2, Line 63, delete "pica base" and insert -- pico base --, therefor.

In Column 3, Line 18, delete "pica base" and insert -- pico base --, therefor.

In Column 3, Line 22, delete "pica base" and insert -- pico base --, therefor.

In Column 3, Line 27, delete "pica base" and insert -- pico base --, therefor.

In Column 3, Line 63, delete "pica base" and insert -- pico base --, therefor.

In Column 4, Line 14, delete "pica cell" and insert -- pico cell --, therefor.

In Column 5, Line 21, delete "pica" and insert -- pico --, therefor.

In Column 5, Line 58, delete "domain;" and insert -- domain, --, therefor.

In Column 7, Line 18, delete "Pas" and insert -- PCIs --, therefor.

Signed and Sealed this
Fifth Day of May, 2015

Michelle K. Lee
*Director of the United States Patent and Trademark Office*

CERTIFICATE OF CORRECTION (continued)
U.S. Pat. No. 8,824,383 B2

In Column 8, Line 6, delete "pica base" and insert -- pico base --, therefor.

In Column 9, Line 26, delete "pica base" and insert -- pico base --, therefor.

In Column 10, Line 51, delete "pica base" and insert -- pico base --, therefor.

In the Claims

In Column 14, Line 1, in Claim 7, delete "beinq" and insert -- being --, therefor.